United States Patent [19]

MacMurray et al.

[11] Patent Number: 4,839,181
[45] Date of Patent: Jun. 13, 1989

[54] METHOD OF REMOVING OUTER PROTECTIVE LAYER FROM EDIBLE MATERIALS USING LASER ENERGY

[75] Inventors: Thomas A. MacMurray, Sewickley, Pa.; William T. McComis, Worthington, Ohio; Anthony A. Boiarski, Columbus, Ohio; James R. Proffitt, Worthington, Ohio; Glen R. Green, Ontario, Oreg.

[73] Assignee: H. J. Heinz Company, Pittsburgh, Pa.

[21] Appl. No.: 126,904

[22] Filed: Nov. 30, 1987

[51] Int. Cl.$^4$ .............................................. A23L 1/212
[52] U.S. Cl. ...................................... 426/237; 17/62; 99/451; 426/482
[58] Field of Search ............... 426/237, 482, 241, 242; 17/62; 99/451

[56] References Cited

U.S. PATENT DOCUMENTS 4,358,467 11/1982 Patel .................................. 426/482

Primary Examiner—George Yeung
Attorney, Agent, or Firm—Burns, Doane, Swecker & Mathis

[57] ABSTRACT

Skin is removed from an edible material by passing the edible material through a skin removal zone of an ablative removal apparatus. In the skin removal zone, skin is ablatively removed by the action of a continuous wave carbon dioxide laser beam which rapidly traverses the skin removal zone in a direction substantially transverse to the edible material movement. The edible material may be skinned regardless of whether it is fresh, frozen, thawed, or cooked. Skin vaporized by the laser light beam generates a gaseous plume which is removed from the skin removal zone by causing a current of air to traverse that zone.

21 Claims, 4 Drawing Sheets

METHOD OF REMOVING OUTER PROTECTIVE LAYER FROM EDIBLE MATERIALS USING LASER ENERGY

BACKGROUND OF THE INVENTION

This invention relates generally to removal of the naturally occurring outer protective layer from food, vegetables, fruits, and other edible material. More particularly, the invention concerns a process wherein a suitably powered continuous wave, carbon dioxide laser beam is used to vaporize the surface layer or layers from food, fruits, vegetable matter or edible material.

There are a large number of situations in the food processing industry where one step in the process involves removing the thin, naturally-occurring outer protective layer from a large number of items. Typically, the one step is part of a more involved process. Such a process might be canning, for example, by which the food is preserved for transportation and marketing in preserved form. Another process might involve subsequent slicing, or cooking, or the like.

There are, of course, a large number of particular foodstuffs for which the present process of removing the thin, naturally-occurring outer protective layer is applicable. Some typical examples will now be discussed in greater detail.

a. Fish Processing

The fish processing industry has grown at very rapid rates in recent years due to increased consumer demand resulting from changing dietary habits, increased costs of other staple foods and improved methods of packing and preserving foods. The fishing industry has thus long since passed from a regional industry to a worldwide industry where fishing vessels travel long distances from their home ports to locations where prime fishing grounds are located. The foregoing, coupled with the competitive nature of the industry and other factors necessitate more than ever, the adoption of economical automated processing and handling methods. That is particularly true of one specific fishing industry, the tuna fishing industry.

The tuna fish is the largest volume product processed by the fish packing industry. The tuna industry is highly competitive and certain operations are extensively automated. The skinning problem, i.e., removal of the naturally occurring, thin, outer protective layer from the fish, is a significant factor in the way the tuna industry processes and packs tuna. According to the typical practice, freshly caught tuna is promptly frozen (sometimes in brine) while still on board the fishing vessels. The frozen tuna is delivered to storage facilities or directly to the processors while still in the frozen state.

When required for production, frozen tuna are removed from storage, approximately graded by size, and thawed. After thawing, the fish are typically placed on conveyor belts, gutted, washed by hand, placed on cooking racks, and cooked in steam ovens. When cooked, the fish are cooled for manual handling.

When cooled, the heads and tails are removed, and the bodies are placed on conveyor belts. The cooked skin has deteriorated into a tar-like substance and is scraped away from the edible loins with hand-held knives or scrapers. The loins are pulled from the bones by hand and the undesirable blood meat is also scraped off. In the scraping process, some edible meat is lost with the skin as well as with the blood meat.

Next, the loins are placed on conveyor belts and sent to can filling machines. Each can is automatically packed with tuna, water or oil, and seasoning. Finally, each can is sealed and sterilized by a "retort" cook.

As can be seen from the foregoing description of the tuna packing process, one critical step in the overall process is the highly labor-intensive operation of removing the skin from the fish loins. Considerable effort is exerted to keep the fish skin moist and elastic to ease its removal by manually scraping with a knife. Even so, the texture changes with time over the 10 or 15 minutes (or longer) the operator takes to clean a number of fish brought to the cleaning table by trolley.

Skin removal has been particularly problematic when dealing with tuna fish. It has been found that raw tuna, whether fresh or frozen, cannot be successfully skinned without simultaneously removing hunks of the underlying tuna meat along with the skin. Since the underlying tuna meat is the commercially significant part of the tuna fish, waste of that meat in a skinning process is commercially unacceptable.

The prevalent method of tuna skinning thus involves deferring the skinning process until after the tuna fish has been cooked. It has been found that during the cooking process a gelatinous layer forms between the skin and the underlying tuna meat or flesh. As a result, the skin will slide off the underlying tuna meat with the gelatinous layer acting much like a lubricant. Actual removal of the skin, however, continues to be a hand operation.

Automated skin removal processes have been proposed such as (a) skinning fish with a caustic solution that is applied to the skin of the fish to saponify the fat thereon and cause a partial dissolution of the skin, (b) selective melting or softening of the skin only on the surface of the frozen fish, (c) contacting the skin of the fish with an acid to produce a denaturization of the fish followed by jets of water to remove the skin, and (d) application of an aqueous dispersion of an at least partially hydrolyzed starch to the skin of the fish followed by drying the skin to cause it to partially peel and thereafter removing the skin. None of the foregoing processes have been particularly successful so that the industry still resorts to manual removal or scraping to remove the fish skin.

Mechanical methods have been proposed to scrape or brush the skin from the cooked fish. But those mechanical methods have their own set of problems, principally that scraping too vigorously can remove valuable edible meat while scraping too gently does not remove all the skin. Secondly, because the fish surface is not always smooth, i.e., there may be indentations or depressions, dependent on the history of fish handling, which inhibit skin removal with mechanical processes. Thus, the skin will not be removed from these parts mechanically and will still require manual removal. Finally, the sticky, greasy nature of the oily fish skin waste quickly contaminates scraper blades or brushes of mechanical devices and, if not removed, impairs the effectiveness of the cleaning operation.

Still further, the voluminous resultant waste from the skinning process presents a substantial disposal problem for the tuna packing industry. The waste is malodorous and difficult to handle.

Accordingly it is seen that the need continues to exist for a fish skinning process which overcomes problems of the type discussed above.

b. Potato Preparation

Another commercial process which involves removal of the thin, naturally-occurring, outer protective layer from an edible item is the preparation of potatoes. After raw potatoes are washed to remove remaining soil in which they are grown, they are frequently skinned as a preparation for other processes. For example, when potatoes are prepared for use as French fries, julienne strips, potato chips and the like, the preparatory step of skinning is typically performed.

In commercial potato treatment facilities, potato skin removal is accomplished automatically rather than manually. That automation is essential due to the large volume of potatoes which must be handled in any given growing season. A typical potato has numerous indentations and irregularities which depart from a smooth surface. Those irregularities and indentations impede the efficient removal of skin. Thus, it is not unsurprising that considerable potato material beneath the skin is lost in commercial potato skinning processes.

Commercially, potato skinning is done with a variety of processes. One common process abrades the skin continually removing the high spots until skin in the low spots has been removed. Another process involves the use of lye to effect peeling of the potatoes. Other processes that have been tried are flame peeling and steam peeling, both of which use heat which is conducted into the layers of potato tissue underlying the skin. While steam peeling is used commercially, flame peeling was tried but was then discarded. Each of these various techniques causes damage to the underlying tissue. That damage results in loss of yield in the finished potato product.

Experience with commercial potato skinning processes indicates that the yield loss ranges from 6 to 25% of the potato during skinning or peeling. On a commercial scale, potato material losses of that level represent serious revenue losses as well.

Accordingly, it is seen that a need continues to exist for processes which would reduce that yield loss.

c. Tomato Peeling

Another commercial process in which the thin, naturally-occurring outer protective layer is removed from a high volume of items is tomato processing. For example, in the preparation of tomato catsup, tomato paste, tomato puree, and canned tomatoes, the raw vegetable is skinned as one step in processing.

Tomato skin removal is rather difficult to accomplish. And, when the skin is removed, the underlying tomato pulp tends to be removed with the skin in an irregular and unpredictable manner. Accordingly, material losses like those discussed above in connection with potatoes are also experienced with tomatoes.

As is well known, beneath the skin of the tomato is a pulpy portion which surrounds a central region having seeds. The central portion tends to have a higher liquid content than does the pulpy portion. Because of this characteristic of the tomato, when products such as tomato catsup and tomato paste are made on a commercial scale, loss of parts of the pulpy portion along with the skin has processing ramifications since the central portion of the tomato generates a higher water content which has to be reduced to obtain the desired consistency in the end product.

Accordingly, it is seen that with tomatoes, there is a further advantage to be obtained from a process which reduces the amount of pulpy flesh removed with the skin.

d. Prior Art

In more general mechanical processes, scraping of one material from the surface of another has been effected in various ways. One recent method involves the use of a continuous wave, carbon dioxide laser light beam which is reflected from a multifaceted circumferential surface of a rotating disk as the light beam is focused on the surface of the object to be scraped. The multifaceted circumferential surface of the disk, combined with rotation of that disk, causes the focused laser light beam to oscillate from side to side so that the light beam appears to have a significant width. When a painted metal surface traverses that light beam, the paint is removed from the surface without adversely affecting the underlying metal. Such a laser device was not considered to be suitable for use on foodstuffs since, in foodstuffs, the composition varies as a continuum unlike the situation where one material, such as paint, is removed from a second, dissimilar material, such as metal.

It is also known, for example, to use a laser beam to cut a hard nut shell into two portions that can be removed to expose the internal nut meat. Such a system is disclosed in U.S. Pat. No. 4,358,467 issued to Patel on Nov. 9, 1982.

SUMMARY OF THE INVENTION

In accord with the present invention, the skin, or thin, naturally-occurring outer protective layer, is removed from an edible material such as a fish carcass, a potato, a tomato, a fruit or the like, by moving the edible material through a skin removal zone in a first direction and at a first predetermined speed. As the edible material moves through that skin removal zone, the skin is ablatively removed from the edible material using a continuous wave laser beam. In the ablative removal step, the skin is virtually vaporized from the edible material.

The ablative skin removal involves exposing the edible material to a focused continuous wave laser beam while the edible material moves through the skin removal zone. The focused laser beam is rapidly traversed across the edible material in the skin removal zone. The direction of movement of the laser beam is generally perpendicular to the first direction. Moreover, the laser beam is traversed at a second predetermined speed which is related to the first predetermined speed such that the edible material advances by a distance no greater than the width of the focused laser beam during each traversal of the beam. An air current is caused to flow across the skin removal zone to remove the plume of smoke and gaseous products from vaporization of the skin from that zone. The laser beam is focused so that the depth of focus is positioned to include the range of heights from which skin is to be removed from the edible material.

If desired, the lateral limits of laser beam traversal may be selected so as to be at least equal to the maximum width of a edible material so that one entire side of the edible material can be deskinned on a single pass. Alternatively, it may be more energy efficient to select the lateral limits of laser beam traversal to a smaller value, for example one inch. In this event, the edible material may require several passes through the skin removal zone to remove generally parallel strips of skin. In either event, the edible material can simply be turned over to remove skin from the other side.

Multiple passes of the edible material through the skin removal zone can also be reduced, or eliminated entirely, by providing two or more skin removal zones, each with a traversing laser beam, and positioning the skin removal zones so that they slightly overlap one another when viewed in the direction of edible material movement.

The skin removal process of this invention can be used regardless of whether the edible material is fresh, frozen, thawed, or cooked. The power density of the laser beam will, however, be adjusted to account for whether the edible material is fresh, frozen, thawed, or cooked.

Preferably, a continuous wave carbon dioxide laser is used as the source of the laser light beam. The continuous wave character is desirable since the laser beam is thus not intermittent. A carbon dioxide laser is also preferred since the wavelength of coherent light in the laser beam is one which is absorbed by water. As water is a significant component of foodstuffs, the carbon dioxide laser beam thus interacts with the product being skinned in a self-limiting manner. Moreover, the carbon dioxide laser happens to be the most economical laser in terms of capital cost per kilowatt.

BRIEF DESCRIPTION OF THE DRAWINGS

Many objects and advantages of the present invention will be apparent to those skilled in the art when this specification is read in conjunction with the drawings wherein like reference numerals are applied to like elements and wherein:

FIG. 2 is an enlarged illustration of the manner in which a laser beam focuses;

FIG. 3 is an enlarged scale detail view of part of the raster wheel of the apparatus of FIG. 1;

FIG. 4 is a chart showing representative skin removal efficiency for different laser power densities and for different type of edible materials;

FIG. 5 is an illustration of another embodiment in which skin is removed simultaneously from the entire girth of an edible material; and FIG. 6 is a view taken along the line 6-6 of FIG. 5, in reduced scale.

DESCRIPTION OF THE PREFERRED EMBODIMENT

Figure 1:
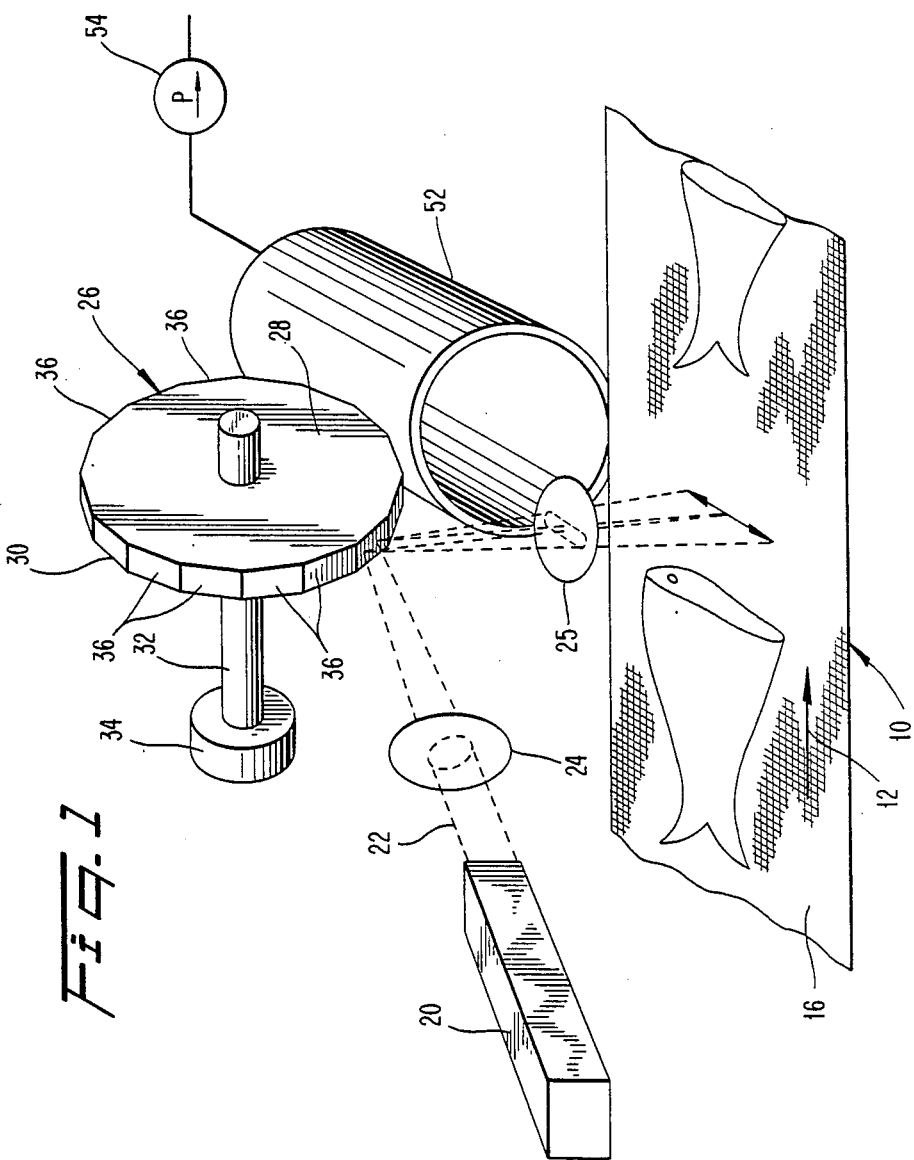
FIG. 1 is a schematic illustration of a deskinning apparatus which is suitable for practicing the present invention.

The present invention involves use of a high intensity energy deposit system, such as a focused laser light beam, to ablatively remove skin from an edible material such as a fish carcass, a potato, a tomato, fruit, vegetables, and the like. The focused laser light beam literally vaporizes the skin from the edible material without heating the flesh underlying the skin. For convenience, the process will be described generally in connection with removal of skin from fish carcasses.

While it is expected that the method of the present invention can be practiced with various apparatus, one suitable type of apparatus will now be described which can be used to practice the invention. A suitable conventional conveyor means 10 (FIG. 1) provides a support surface for one or more edible materials. The conveyor means 10 is also operative to move edible materials in a first predetermined direction, illustrated by the arrow labelled 12, toward and through a skin removal zone 14, illustrated for convenience by a double-headed arrow.

The conveyor means 10 has an upper surface 16 which can be fabricated from, or coated with, any suitable conventional material which can be readily cleaned and which is otherwise suitable for use with the foodstuff being skinned, tuna fish in the present case.

As an energy source, a continuous wave carbon dioxide laser 20 with the ability to generate a laser light beam 22 which can be focused to a high power density, $P_D$, is preferred, where power density represents the output energy of the laser divided by the cross-sectional area of the focused beam. For example, with a 2.5 kw carbon dioxide laser beam, a power density of 79.6 kw/cm$^2$ at a wavelength of 10,600nm is obtained when focused to a spot diameter of 0.2 cm.

A continuous wave laser is preferred, rather than an intermittent laser, since the laser light beam 22 is oscillated through the skin removal zone 14. With an intermittent laser light source, alternating periods of energy pulses introduce an additional level of complexity since the apparatus needs to be synchronized with the energy pulses to assure that each laser energy pulse overlaps the footprint of the immediately preceding laser energy pulse on the skin surface being removed. Such a condition is not a requirement for continuous wave lasers. Accordingly, it appears that this additional operational requirement for a continuous wave laser has considerable probability of accelerating the speed with which the conveyor means 10 can advance edible materials through the skin removal zone 14.

The carbon dioxide laser is presently preferred as the laser energy source. The wavelength of the laser light beam 22 generated by a continuous wave carbon dioxide laser 20 is a wavelength of light for which water has a strong absorption. As the apparatus will be used to remove skin from edible materials, and since flesh beneath the skin has a substantial water content, the ablative action of the laser light beam 22 on the skin is self-limited by the edible material due to absorbency of water to the wavelength of the laser light beam 22.

Of the currently available lasers, the carbon dioxide laser also happens to be the most economical in terms of capital cost per kilowatt of power. While the carbon dioxide laser is presently preferred, other lasers may be desirable for other reasons. Moreover, new types of lasers may be developed which are even more attractive for the purposes herein described.

Power density requirements for deskinning fish with the continuous wave carbon dioxide laser 20 are presently estimated at about 90 kw/cm$^2$ and higher if and when those power densities become available. Required power density is also dependent upon the species of fish carcasses being deskinned and upon such factors as whether the carcass is cooked, fresh, frozen, or thawed. Empirically obtained variations of (a) the surface removal rate (i.e., cm$^2$/sec) per kilowatt of laser energy for (b) various power densities of the laser light beam 22 measured in kilowatts per square centimeter for the particular fish carcass establish the preferred power density for a particular carcass deskinning application. The following tables provide a comparison of power density, as well as other information, for one species of tuna fish with different conditions of preparation (Table 1), and for different edible material (Table 2).

TABLE 1

REMOVAL EFFICIENCY AS A FUNCTION OF POWER DENSITY FOR FROZEN, THAWED, AND COOKED SKIPJACK TUNA

| Condition | Beam Power, kw | Power Density, kw/cm$^2$ | Transit Speed, cm/sec | Removal, cm$^2$/sec | Removal Eff., cm$^2$/sec/kw |
|---|---|---|---|---|---|
| Frozen | 2.92 | 93.0 | 18.0 | 32.4 | 11.1 |
|  | 2.11 | 67.2 | 13.0 | 23.4 | 11.1 |
|  | 1.36 | 43.3 | 5.0 | 9.0 | 6.6 |
| Thawed | 2.90 | 92.4 | 25.4 | 45.7 | 15.8 |
| Cooked | 2.63 | 83.8 | 42.3 | 76.1 | 28.9 |
|  | 1.00 | 31.8 | 5.5 | 9.9 | 9.9 |

TABLE 2

REMOVAL EFFICIENCY AS A FUNCTION OF POWER DENSITY FOR POTATOES AND TOMATOES

| Item | Beam Power, kw | Power Density, kw/cm$^2$ | Transit Speed, cm/sec | Removal, cm$^2$/sec | Removal Eff., cm$^2$/sec/kw |
|---|---|---|---|---|---|
| Potatoes | 2.80 | 89.2 | 33.7 | 60.7 | 21.7 |
|  | 2.00 | 63.7 | 24.1 | 43.4 | 21.7 |
|  | 1.44 | 45.9 | 14.4 | 25.9 | 18.0 |
| Tomatoes | 0.62 | 19.75 | 24.0 | 43.2 | 69.7 |
|  | 0.30 | 9.55 | 5.5 | 9.9 | 33.0 |

In Tables 1 and 2, the focused spot diameter of the continuous wave carbon dioxide laser is 0.2cm and the beam scan length is 1.8 cm.

The laser light beam 22 from the continuous wave carbon dioxide laser 20 passes through a focusing lens 24 which has a focal length corresponding essentially to the total linear distance traversed by the laser light beam 22 between the focusing lens 24 and the upper surface 16 of the conveyor means 10. A suitable lens may have a focal length in the range of 18 to 24 inches.

The precise distance from the upper surface 16 of the conveyor means 10 to the focusing lens 24 measured along the length of the laser light beam 22 depends upon (a) the upper and lower elevations of the skin surface to be removed measured relative to the upper surface 16 of the conveyor means 10, (b) the depth of field at the focus of the laser light beam 22, and (c) the focal length of the focusing lens 24. In particular, the depth of field at the focus of the laser light beam 22 is positioned so as to encompass both the upper and lower elevations of the skin surface to be removed. And, the focal length measured from the middle of the depth of field at the focus of the laser light beam 22 positions the focusing lens 24.

Generally speaking, the depth of field at the focus, $D_f$, (see FIG. 2) for any lens is a function of the diameter of the lens, the wavelength of the light beam being focused, the focal length of the lens, and the quality of the light beam (i.e., the amount of divergence over a given distance, typically measured as stearadians/meter). Depth of field at the focus for a lens can be expressed as:

$$\text{Depth of field} = \frac{8}{3} \times \frac{\text{focal length of lens}}{\text{original beam diameter}}$$

Since the focusing lens 24 (FIG. 1) shapes the laser light beam 22 toward a small diameter focal spot, it is desirable to rapidly move that focal spot laterally to the direction of movement 12 of the conveyor means 10 so that the laser light beam 22 virtually corresponds to a line in the skin removal zone 14 that is generally perpendicular to the direction of movement 12. Further, if the rapid traversal of the focal spot is accomplished such that the conveyor means 10 advances in the direction of movement 12 by a distance no greater than the diameter of the focal spot, then the laser light beam 22 has the virtual effect of being a wide blade.

To accomplish the rapid traversal of the focal spot, the laser light beam 22 is reflected from a raster means 26 to the skin removal zone 14. The raster means 26 includes a raster disc 28 having a circumferential peripheral surface 30. The raster disk 28 may have a diameter on the order of 14 inches and is suitably mounted on a rotatable shaft 32. Suitable conventional bearings (not shown) may be used to mount the shaft to supporting structure (not shown) so that the raster disc 28 is positioned above the upper surface 16 of the conveyor means 10. Ordinarily, the axis of the shaft 2 will be in general alignment with the direction of movement 12 of the conveyor means 10 so that the focal spot can traverse the upper surface 16 of the conveyor means 10 in a direction generally perpendicular to the direction of movement 12.

A suitable conventional motor 34 is attached to one end of the rotatable shaft 32 and is operable to spin the shaft and the raster disc 28 at angular velocities on the order of 200 to 2000 rpm. The peripheral surface 30 of the raster disc 28 has an integral number of generally planar reflecting surfaces 36. While only sixteen reflecting surfaces 36 are illustrated in FIG. 1 for the sake of clarity, thirty-six or more identical reflecting surfaces can be provided on the peripheral surface 30. These reflecting surfaces 36 may, for example, be fabricated from a polished metal such as copper.

The rastering effect accomplished by the rotating raster disc 26 can be best appreciated from FIG. 3. Two reflecting surfaces 36', 36" (which are identical to the reflecting surfaces 36 of FIG. 1, the ' and " superscripts merely being used for convenience of reference) meet at an edge 40 which is generally parallel to the axis of rotation of the raster disc 26. Each of the reflecting surfaces 36', 36", subtends an angle, o, about the axis of the raster disk 28 which is equal, in degrees of arc, to 360 divided by the total number of reflecting surfaces 36.

An incident light ray 42 from the continuous wave carbon dioxide laser 20 (FIG. 1) strikes the reflecting surface 36' (FIG. 3) with an angle of incidence, i, measured from the normal 44 to the reflecting surface 36'. As the raster disk 28 moves so that the edge 40 comes into alignment with the incident light ray 42, the normal 44 to the reflecting surface 36' moves to the position illustrated in FIG. 3 (for purposes of this discussion it is assumed that the raster disk 28 moves in the clockwise direction; however, the direction of rotation is not a limitation). As the raster disk 28 rotates past the edge 40, the incident light ray 42 strikes the reflecting surface 36" with an angle of incidence, i* measured relative to the normal 48 to the reflecting surface 36".

It can be shown from elementary plane geometry that the angle between the normal 44 to the reflecting surface 36' and the normal 48 to the reflecting surface 36" is equal to the angle, o. From elementary physics it is known that the angle of reflection from a surface is equal to the angle of incidence. Thus, as the raster disk 28 rotates across each edge 40, the reflected light ray moves from the direction 46 having an angle of reflection, o, measured with respect to the first surface normal 44 to the direction 50 having an angle of reflection, r*, measured with respect to the second surface normal 48. It can be shown from elementary plane geometry and from elementary physics that the reflected light ray changes its direction by an angle equal to 2o.

Moreover, it will be observed from the foregoing discussion that the angular change in the reflected light ray is instantaneous in comparison to the rate at which the second surface normal 48 moves to the position 46 as the raster disk 28 rotates. It will be seen from FIG. 1 and the foregoing discussion that the focused laser light beam 22 traverses an angle of 2o centered on the surface of the raster disk 28. As a result, the length of the skin removal zone 14 can be adjusted by vertically adjusting the position of the raster disk 28. Classical trigonometric relationships determine the effect of vertical adjustment on the length of the skin removal zone 14. If desired, the length of the skin removal zone 14 can thus be adjusted so that the entire surface of a edible material is deskinned in a single pass. Alternatively, the length of the skin removal zone 14 can be adjusted so that essentially parallel strips of skin are removed from the edible material at the skin removal zone 14.

If desired, it is also possible to place a second focusing lens 25 between the raster disk and the conveyor means 10. The second focusing lens helps to further concentrate the laser light beam after it has been reflected from the peripheral edge of the raster disk.

It will be seen from FIG. 1 that the distance of the focusing lens 24 from the point of reflection on the peripheral surface of the raster disk 28 and the distance of the second lens 25, if used, will determine the elevation of the depth of field of the laser light beam 22 focus relative to the upper surface of the conveyor means 10. Thus, adjustment of the focusing lenses 24, 25 along the axis of the laser light beam can readily be effected to accommodate the location of the surface to be skinned.

When skin from the edible material is ablatively removed, a gaseous cloud forms in the vicinity of the skin removal zone 14. That gaseous cloud may interfere with the action of the continuous wave carbon dioxide laser 20 if the cloud is not removed. The gaseous cloud may be removed by causing an air current to traverse the skin removal zone 14. To this end, a collection tube 52 may be positioned next to the conveyor means 10 in general lateral alignment with the skin removal zone 14. In addition, the collection tube 52 may be centered so as to be in general alignment with the center of the depth of focus of the laser light beam. A suitable conventional suction pump or fan 54 may be connected to the collection tube 52. Accordingly, when the suction pump 54 is operating, it sucks air into the collection tube 52. The pump 54 is sized to entrain a sufficiently large volumetric air flow so that the gaseous cloud is sucked into the collection tube 52 with sufficient speed that the gaseous cloud does not interfere with operation of the laser light beam.

There are, of course, certain modifications of the apparatus which can be made. For example, it is possible to use optics to reshape the laser light beam from a cylindrical shape to a generally planar shape using a cylindrical lens or a two-dimensional parabolic mirror to focus the laser light beam in one direction. Such an optical system would likely be used in lieu of one or both of the focusing lens 24, 25 and the raster disk 26.

While the apparatus has been described with a collection means that uses a suction pump, it will also be appreciated that a pressure pump or fan could be employed creating a jet of air to substantially continuously sweep the skin removal zone 14. For that matter, it would even be possible to use both a pump or fan to create a jet and a suction collection arrangement to capture the jet thus created.

Should it be determined that the gaseous products of the ablative skin removal process are toxic or noxious, it is also contemplated that the exhaust from the suction pump or fan 54 would be further processed to remove the noxious or toxic components.

From the foregoing description of possible apparatus, it will be noted that the length of the skin removal zone 14 in the direction transverse to the direction of movement of the conveyor means 10 may be larger than the maximum width of the edible material being deskinned. In that event, one side of the edible material would be deskinned during a single pass through the skin removal zone.

On the other hand, if the maximum width of the edible material being deskinned exceeds the length of the skin removal zone 14, then the apparatus described above will remove a strip of skin from the edible material. To remove remaining skin from the edible material, the edible material may be passed through the skin removal zone 14 one or more additional times, with the material being positioned on the upper surface of the conveyor means on the successive passes so that a part of the material which was not previously deskinned is in longitudinal alignment with the skin removal zone 14.

Alternatively, additional skin removal zones could be provided. In this event, the additional skin removal zones would preferably be placed so that the strips of skin which are removed thereby are contiguous with or slightly overlapping with the strip of skin removed by the first skin removal zone 14.

In order to remove skin from the second side of the edible material, the edible material can be turned over and passed through the skin removal zone 14.

While the foregoing description of apparatus has assumed for simplicity that the edible materials move horizontally, it is also possible that the edible material could move vertically through a skin removal zone. In this event, it could be possible to remove skin completely around the girth of a edible material in a single pass through the apparatus.

It is also possible to arrange a pair of generally horizontal conveyors 60, 62 (see FIG. 5) with a narrow space 64 between them in which two or more laser beams are simultaneously focused on different sides of the article being skinned. In this embodiment, it may also be possible to provide an annular manifold 66 in the space between the horizontal conveyors to direct a jet of compressed air toward the edible material 68 so as to carry off the gaseous products from the effect of the laser on the skin.

As can best be seen from FIG. 6, the laser energy to remove the skin from the edible material 66 may be provided by three lasers 70, 70', 70''. These laser energy sources are comparable to that described above in connection with the first embodiment. Each laser generates a beam of laser energy which is directed toward the edible material 68. When the lasers are all disposed in generally parallel relation as in FIG. 6, suitable conventional reflecting mirrors 72, 72'' may be provided for corresponding laser energy sources 70, 70'' so that three laser beams impinge upon the surface of the edible material 68 at angles of about 120°. Each laser beam also impinges upon a suitable conventional laser energy absorber 74, 74', 74" after the edible material 68 passes the beams. With this arrangement, there is little likelihood that spurious laser energy will escape into the environment.

The multiple beams could also be obtained by beam splitting or, as illustrated, by providing a multiplicity of laser energy sources. In either event, it would be possible to remove skin completely around the girth of a edible material in a single pass.

Having thus described apparatus which is suitable for the deskinning process of the present invention, the edible material deskinning process will now be described in conjunction with that apparatus.

As a preliminary matter, an empirically obtained chart of skin removal efficiency for variations in carbon dioxide laser power density will be needed for (a) the species of edible materials to be skinned and (b) for edible materials with different states of preparation, i.e., fresh, frozen, thawed, or cooked. The skin removal efficiency may be presented as a surface removal rate per kilowatt of laser power, i.e., $cm^2/sec/kw$. The power density, $P_D$, is expressed as kilowatts per unit cross-sectional area of the focused laser beam, $kw/cm^2$. A sample empirical chart of skin removal efficiency for laser power density is provided in FIG. 4 for cooked tuna 60 and frozen tuna 62.

Generally speaking, it will be desirable to use the highest available skin removal efficiency. The highest available skin removal efficiency may, however, be limited by the maximum power available from the continuous wave carbon dioxide laser being used. From the empirical chart, the highest skin removal efficiency will be identified. For example, for frozen tuna fish carcasses, a maximum skin removal efficiency of about 11 $cm^2/sec/kw$ is available for a laser power density of about 67 to 93 $kw/cm^2$.

For a rastered laser beam, the power density discussed above represents the spot power density, i.e., the power density of the focused beam at the location of the focus. There is, in addition, a time-average power density for a rastered laser beam. The time-average power density is determined from the available output power of the laser and the cross-sectional area of a traversal stroke of the rastered beam. That cross-sectional area corresponds to the product of the length of the traversal stroke times the diameter of the focused beam. Thus, for a particular setting of the apparatus, the cross-sectional area of the laser beam is known so the time-averaged power requirement will be established. The relationship between the spot power density and the time-averaged power density depends upon the angular velocity of the raster disk, the number of reflecting surfaces on the peripheral surface of the raster disk, and the laser beam concentration accomplished by focusing. As those factors are known for a given apparatus, the relationship between power for the continuous wave carbon dioxide laser and the time-averaged power density can easily be determined.

So far, the skin removal results have been correlated on the spot power density since the intensity of the laser energy as measured by the spot power density is sufficient to effect skin removal. Whether the time-averaged power density and the spot power density are equally determinative parameters in predicting skin removal efficiency has not been completely resolved. Knowing the spot power density available from the laser, the corresponding skin removal efficiency can be ascertained from correlations of empirical data.

It will be seen that the empirical data correlations indicate that there is, in general, a maximum skin removal efficiency. When practicing this invention, it is preferred to operate the laser so as to maximize the skin removal efficiency. Thus, the laser is operated at a power level which produces the spot power density corresponding to the maximum skin removal efficiency for the product being skinned. In the event that the spot power density required for maximum skin removal efficiency is greater than the spot power density available from the particular laser and optical system being used, then the maximum available spot power density from the laser and its optical system is used, with the skin removal efficiency being ascertained from the empirical data.

Having thus determined the skin removal efficiency, in $cm^2/sec/kw$, and the laser spot power density, in $kw/cm^2$, and further knowing the focused spot area, the required laser power is determined. Next, the surface removal rate, in $cm^2/sec$, can be determined from the laser power and the skin removal efficiency. Knowing the length of the skin removal zone 14, the velocity of the edible material, in cm/sec, is therefore known which will meet the requirements of spot power density and skin removal efficiency.

With the foregoing information, the speed of the conveyor means 10 in the first predetermined direction is known and appropriate speed adjustments to the drive motor(s) for the conveyor means 10 are made.

The edible materials to be deskinned are also examined to determine the maximum and minimum height of the material surface above the upper surface 14 of the conveyor means 10. Then, the elevation of the raster means 26 above the upper surface 14 is adjusted so that the length of the skin removal zone corresponds to the width used in determination of the effective cross-sectional area of the laser beam. In addition, the position of the focusing lens 24 is adjusted so that the area of the edible material to be deskinned lies within the depth of field of the focus of the laser beam.

With the apparatus thus adjusted, the suction pump 54 is started to establish a current of air across the skin removal zone 14, the motor 34 is started to rotate the raster disk 28, and the continuous wave carbon dioxide laser 20 is energized at the power level determined to be appropriate from the analysis discussed above. Next, edible materials are placed on the upper surface 16 of the conveyor means 10 to be advanced into the skin removal zone 14. As the edible material moves through the skin removal zone 14, the skin is ablatively removed by the action of the laser light beam.

As the fish skin is ablatively removed by the laser, it is vaporized into a plume of smoke which is substantially free of ash and soot. The smoke plume is sucked away into the collection tube 52 and ultimately disposed of. The byproducts of the ablative process, as presently known, include water, carbon dioxide, and carbon. It is possible that burning protein molecules in the fish skin during the ablative process will result in noxious fumes. Accordingly, the collected smoke plume may be further treated to eliminate such noxious wastes.

During the ablative skin removal, the laser light beam rapidly traverses the surface of the edible material. For each traversal of the fish surface, the laser light beam vaporizes a strip of skin having a length corresponding to the length of the skin removal zone measured transversely to the direction of movement of the conveyor means 10 and having a width corresponding to the focused diameter of the laser light beam. Since the velocity of movement of the conveyor surface is coordinated as discussed above, each successive traversal of the edible material by the laser light beam at least slightly overlaps the preceding traversal of the edible material. As a result, the successive traversals give the appearance of a continuous skin removal.

The carbon dioxide laser is preferred for use in connection with this method since fish flesh as well as other edible materials have a substantial amount of water, since water has a strong absorbency for the wavelength of the carbon dioxide laser beam, and since there is usually a substantial color difference between skin and the underlying flesh. The foregoing factors give rise to a shift in the efficiency of removal between skin and flesh which leads to a natural mechanism to stop the laser ablation process.

As a result of the interaction between the laser light beam and the skin of the material, the skin is vaporized virtually instantaneously into a gaseous cloud. That gaseous cloud is removed from the skin removal zone 14 by the current of air caused to traverse the skin removal zone with a sufficient velocity to clear the gaseous cloud. If necessary, the gaseous products of the skin removal are treated to remove noxious and/or toxic constituents.

After passing through the skin removal zone one time, the edible material may be turned over and passed through the skin removal zone a second time to remove the skin from the second side of the carcass. Such a procedure is used where the traversal width of the laser beam in the skin removal zone equals or exceeds the width of the edible material as it lies on the upper surface 16 of the conveyor means 10.

Where the traversal width of the laser beam is less than the width of the edible material, the edible material can be passed through the skin removal zone one or more additional times. During each successive pass, the edible material is placed such that an unskinned part of the material is in longitudinal alignment with the skin removal zone 14. Accordingly, the skin is removed in generally parallel strips from the edible material.

Alternately, additional skin removal zones can be provided, typically such additional skin removal zones are laterally offset from the first skin removal zone so that there is at least a slight overlap between adjacent zones when viewed from the direction of movement of the conveyor means 10.

Although the invention has been described as applied to tuna, it is to be understood it can be used to remove skin from catfish, swordfish, sea bass and other edible fish. Moreover, it is also to be understood that the method and apparatus have more general applicability to other edible materials such as potatoes, tomatoes, fruit, other vegetables and the like.

The process of the present invention has many significant advantages when contrasted with existing fish skin removal processes. For example, with the present method, the skin is vaporized from the edible material in an essentially instantaneous process. That vaporization eliminates the need to dispose of malodorous solid waste in the form of fish skin and associated residue. Instead, a gaseous plume results that can be effectively treated as required to remove any impurities which may exist. Neither soot nor ash results from the process.

Moreover, the rate of energy input per unit area is so high that the surface layer can be vaporized while thermal conduction to the underlying flesh or tissue is insignificant. This advantage is not possible from other techniques, including for example flame peeling or steam peeling of potatoes.

Since the laser light beam continues until it strikes the edible material, surface imperfections in the material surface have essentially no consequence. The laser rastering technique removes the skin from depressions or protrusions with equal efficacy. Moreover, since the ablative process of skin removal is essentially self-limiting due to the high water content of the underlying flesh or tissue, the presence of depressions or protrusions does not cause any change in the amount of material removed from the material surface.

Another advantage of the present method of skin removal deals with the effect of skin removal on the underlying flesh or tissue. As previously noted, the underlying flesh or tissue is not removed in any greater thickness in the vicinity of depressions or protrusions on the surface. In addition, the rapidity of the process, does not cause significant amounts of residual heat in the underlying flesh or tissue. Accordingly, partial cooking of the underlying flesh or tissue is avoided.

Moreover, the method can be used on raw, as well as cooked, thawed or frozen edible materials.

It will be seen from the foregoing, that the process of the present invention allows a substantial reduction in the amount of hand labor required in removal of the thin, naturally-occurring outer protective layer from edible materials such as is used in tuna processing industry, the potato processing industry, the tomato processing industry, and the like. More specifically, instead of having each item skinned or peeled by hand, the only hand labor required is to place the edible materials on the conveyor means. Presently, it is estimated that the new method will permit reductions of as much as 80% in labor costs for tuna skinning. For potatoes, peel loss can be reduced to 2 to 3 percent of the starting weight as compared to a loss of 6 to 25 percent which is common with other peeling processes.

From the foregoing description, it will now be apparent that, in accordance with the present invention, a novel method of removing skin from edible materials has been disclosed. Moreover, it will be apparent to those skilled in the art that numerous modifications, substitutions, and equivalents exist for features of the invention which do not materially depart from the spirit and scope of the invention. Accordingly, it is expressly intended that all such modifications, variations, substitutions, and equivalents of the features of the invention be embraced by the appended claims.

What is claimed is:

1. A process of removing a thin naturally-occurring outer protective layer from an edible material comprising the steps of:
    moving the edible material through a skin removal zone in a first direction at a first predetermined speed; and
    ablatively removing the thin naturally-occurring outer protective layer from the edible material as the edible material moves through the skin removal zone using a focused continuous wave laser beam.

2. The process of claim 1 wherein the step of moving includes the step of advancing an unskinned fish carcass through the skin removal zone with a conveyor means.

3. The process of claim 1 wherein the step of moving includes the step of advancing an unpeeled potato through the skin removal zone with a conveyor means.

4. The process of claim 1 wherein the step of moving includes the step of advancing an unpeeled tomato through the skin removal zone with a conveyor means.

5. A process of removing skin from an edible material comprising the steps of:
  moving the edible material through a skin removal zone in a first direction at a first predetermined speed; and
  ablatively removing skin from the edible material as the edible material moves through the skin removal zone using a focused continuous wave laser beam.

6. The process of removing skin in claim 5 further including the steps of:
  exposing the edible material to a focused continuous wave laser beam while the edible material moves through the skin removal zone; and
  rapidly traversing the edible material with the focused continuous wave laser beam in the skin removal zone, the laser beam traversal being in a direction generally perpendicular to the first direction and at a second predetermined speed, the second predetermined speed being such that the edible material advances by a distance no greater than the width of the focused continuous wave laser beam.

7. The method of removing skin from the edible material according to claim 6 wherein the edible material has a maximum dimension transverse to the first direction of movement and wherein the traversal step moves the continuous wave laser beam through a distance at least as large as the maximum dimension.

8. The method of removing skin from edible material according to claim 6 wherein the traversal step includes moving the continuous wave laser beam through a fixed distance, and including the further step of passing the edible material through the skin removal zone at least one additional time to remove the skin in generally parallel strips.

9. The method of removing skin from edible material according to claim 6 wherein the traversal step includes moving the continuous wave laser beam through a fixed distance, including the further step of providing at least one additional skin removal zone partially overlapping the first skin removal zone in the direction of edible material movement, and passing the edible material through the overlapping skin removal zones.

10. The method of removing skin from edible material according to claim 6 wherein the traversal step includes moving the continuous wave laser beam through a fixed distance, including the further step of providing at least one additional skin removal zone partially overlapping the first skin removal zone in the direction of edible material movement, and passing the edible material through the overlapping skin removal zones in such a manner that substantially all skin is removed from one side of the edible material when the edible material makes a single pass through the skin removal zones.

11. The method of removing skin from edible material according to claim 10 including the steps of turning the edible material over to present the second side to the laser beams and passing the edible material through the overlapping skin removal zones to remove substantially all skin from the second side of the edible material.

12. The method of removing skin from edible material according to claim 5 including the preliminary step of freezing the edible material.

13. The method of removing skin from edible material according to claim 5 including the preliminary step of thawing the edible material.

14. The method of removing skin from edible material according to claim 6 including the step of selecting the power density for the continuous wave laser beam such that the laser beam completely removes the skin layer of the edible material.

15. The method of removing skin from edible material according to claim 6 including the step of generating an air current across the skin removal zone to remove gaseous products of the ablative skin removal.

16. The method of removing skin from edible material according to claim 6 including the step of using a carbon dioxide laser.

17. The method of removing skin from edible material according to claim 6 wherein the edible material has skin between vertically spaced limits and including the step of focusing the laser beam such that the depth of field of the focus includes the vertically spaced limits.

18. The process of claim 5 wherein the waste material from said carbon dioxide laser beam is recovered in the form of a gaseous cloud that is generated by the application of s id beam to the skin.

19. The method of claim 6 wherein the exposing step includes the step of essentially simultaneously exposing the periphery of the edible material to focused continuous wave laser beams while the edible material moves through the skin removal zone so that skin is removed from all sides of the edible material in a single pass through the skin removal zone.

20. A process of removing a thin naturally-occuring outer protective layer from an edible material comprising the steps of:
  moving the edible material through a skin removal zone in a first linear direction at a first predetermined speed; and
  ablatively removing a strip of the thin naturally-occurring outer protective layer from the edible material as the edible material moves through the skin removal zone using a focused continuous wave laser beam, the strip being substantially wider than the thickness of the naturally-occurring outer protective layer.

21. A process of removing a thin naturally-occurring outer protective layer from an edible material comprising the steps of:
  moving the edible material through a skin removal zone in a first direction at a first predetermined speed;
  ablatively removing the thin naturally-occuring outer protective layer from the edible material as the edible material moves through the skin removal zone using a focused continuous wave laser beam; and
  self-limiting the depth of removal of the outer layer with water content of the edible material.

* * * * *